UNITED STATES PATENT OFFICE.

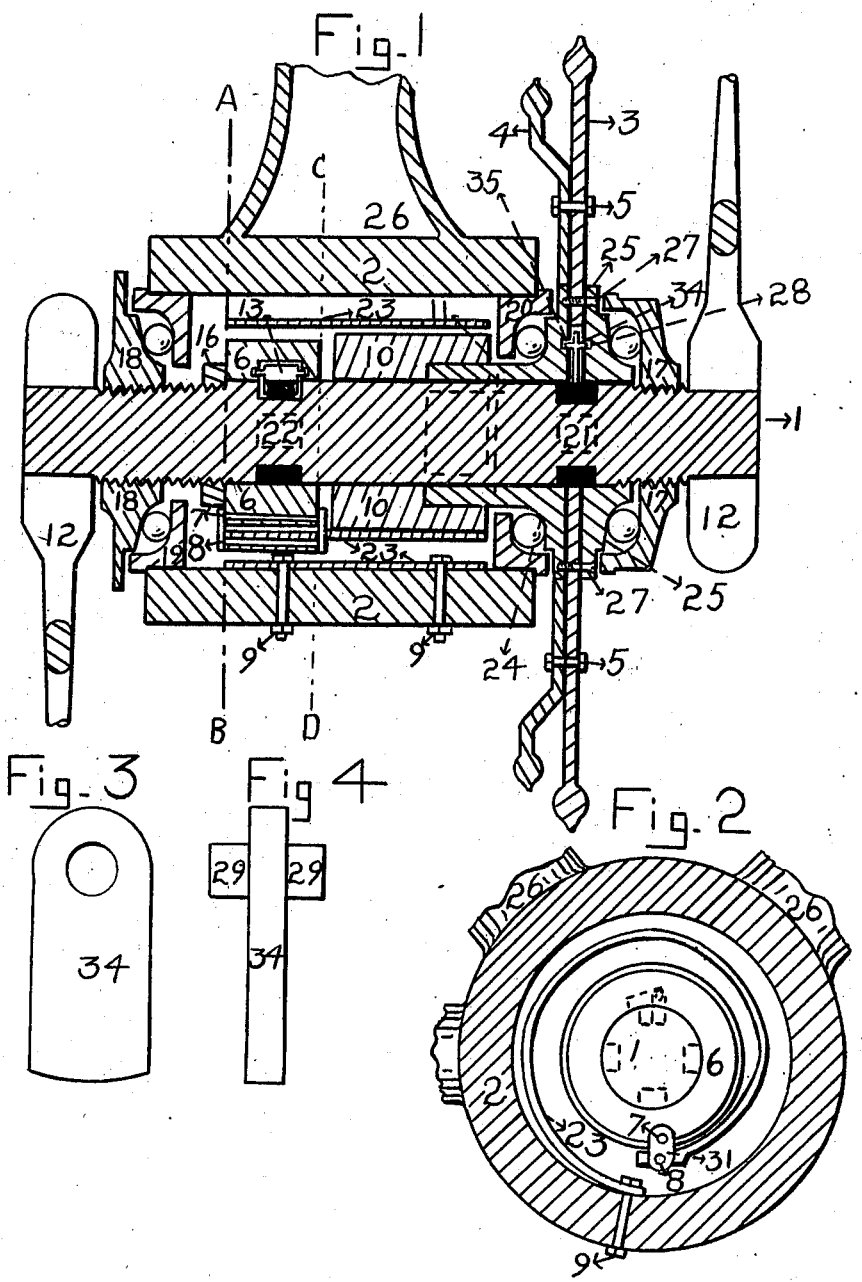

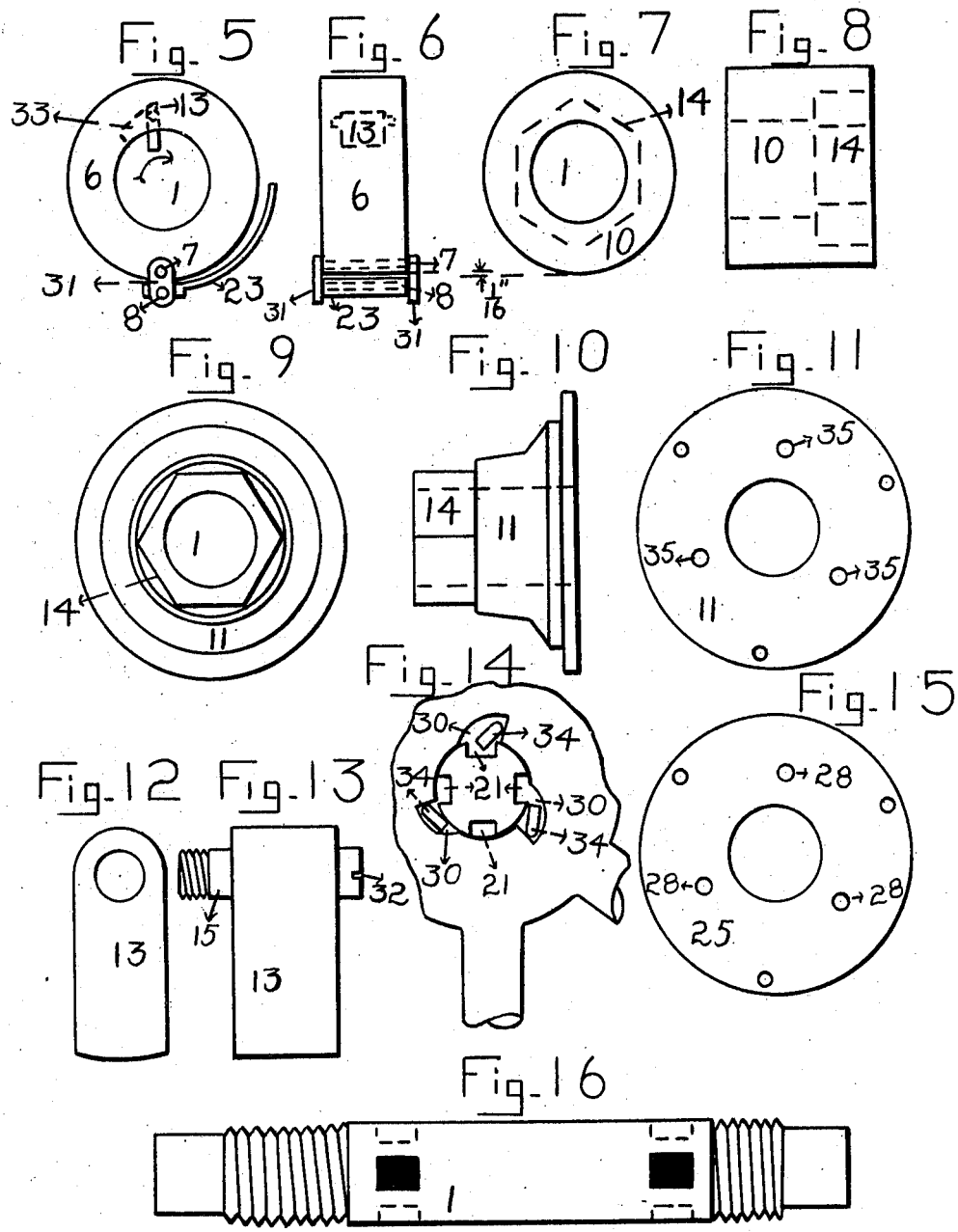

DENNIS MATHEW KEEFE, OF COLORADO SPRINGS, COLORADO, ASSIGNOR OF ONE-HALF TO JOHN T. JONES, OF COLORADO SPRINGS, COLORADO.

COASTER-BRAKE AND REVERSIBLE COUNTER-SHAFT.

988,941. Specification of Letters Patent. Patented Apr. 4, 1911.

Application filed November 14, 1908. Serial No. 462,602.

*To all whom it may concern:*

Be it known that I, DENNIS M. KEEFE, a citizen of the United States, residing at Colorado Springs, in the county of El Paso and State of Colorado, have invented a new and useful Coaster-Brake and Reversible Counter-Shaft, of which the following is a specification.

My invention relates to improvements in coaster brakes, and reversible counter shafts, situated in the crank hanger of a motor cycle or other velocipede using a counter shaft provided with pedal cranks or a hand lever for setting a brake or assisting in the locomotion of the machine proper; and the objects of my improvements are, first, to provide a large strong brake band and surface for same in a part of the machine, remote from the driving wheel or wheels, and convenient to be manipulated by the operator of the machine. Second, to provide a simple, strong, and direct connection between the counter shaft and the main sprocket wheel. Third, to remove the necessity of a coaster brake in the driving wheel, or driving wheels. Fourth, to remove the complicated machinery from the driving wheels to a place where there is less liability of becoming contaminated with mud, or dust, or grit raised by the wheels. I attain these objects by the mechanism illustrated in the accompanying drawings, in which:

Figure 1, is a rear cross sectional view through the center of the shaft and crank hanger of a motor cycle. Fig. 2, is a sectional view of the crank hanger of a motor cycle, viewed from the left on the line A. B. Fig. 3, is a detailed view of the right side of the clutch dog. Fig. 4, is a rear view, in detail, of the clutch dog. Fig. 5, is a view of the left side of the brake collar, on line A. B. Fig. 6, is a rear view of the brake collar. Fig. 7, is a view of the left end of the brake drum. Fig. 8, is a rear view of the brake drum. Fig. 9, is a view of the left end, of the inside sprocket cone hub. Fig. 10, is a rear view of the inside sprocket cone hub. Fig. 11, is an upright view of the right side of the inside shaft cone hub. Fig. 12, is a detailed side view of the dog. Fig. 13, is a detailed view of the dog. Fig. 14, is a view of the right side of the hub part of sprocket wheel, showing the three dogs. Fig. 15, is a side view of the left side of outside cone. Fig. 16, is a rear view of the reversible counter shaft.

Similar letters and figures refer to similar parts throughout the several views.

The frame 26, 26, crank hanger 2, counter shaft 1, the brake drum 10, and brake collar 6, constitute the principal parts of my invention.

In the crank hanger 2, is situated brake band 23, attached to the lower side thereof, by means of bolts 9, 9. Within brake band 23, are suspended, brake collar 6, and brake drum 10, upon reversible counter shaft 1, which is itself suspended by means of ball bearings on left side ball race 19, and inside ball race 20, rigidly attached to crank hanger 2.

Reversible counter shaft 1, has rigidly attached to it, by means of cut threads, outside race cup 17, and left side cone 18, and has rigidly attached to its ends the two pedal cranks 12, 12, which may be removed and have substituted therefor a suitable lever or crank as desired.

The crank hanger 2, is part of the frame of an ordinary motor cycle and is integral with tubes 26, 26, 26, of the frame of the machine.

The reversible counter shaft 1, is intended to be used for the purpose of setting the brake band 23, down rigidly on the curved surface of the brake drum 10, by forcing the pedal cranks backward on top or forward on the bottom, thus engaging clutched dog 13, located in brake collar 6, in one of the recesses 22, 22, as shown in Fig. 5. This forces backward on top and forward on the bottom brake collar 6, thus drawing the lower end of brake band 23, forward on the bottom by means of attachment at clevis pin 8, connecting it with clevis jaws 31, 31, which are connected with the lower side of brake band 6, by means of clevis pin 7. This draws brake band 23, forcibly against the curved surface of drum 10, retarding its motion; thus retarding the motion of driving sprocket wheel 4, and main sprocket wheel 3, which are connected by threaded pins 27, 27, to inside sprocket cone hub 11, which is connected rigidly with brake drum 10, by means of hexagon tenon 14, and will continue to retard the motion of the two sprocket wheels, during the time that the pedal cranks are held in a reverse position, as herein described. But when released of the reverse pressure in pedal cranks the brake band 23, by means of its elasticity, will re-assume its former position by becoming more nearly straight, and thus passing away from brake drum 10, and thus release it from the friction, and in this case the sprocket wheels 3, and 4, will be released from any retarding force at the brake drum 10. Said sprocket wheel 4, is connected with a source of power, and said sprocket wheel 3 is connected by chain or belt with the rear wheel of the motor-cycle.

In Fig. 12, and Fig. 13, are shown two exaggerated views of the dog 13, and the threaded pin 15, which are shown in the upper part of brake collar 6. In Fig. 12, and Fig. 13, threaded pin 15, herein shown, is provided near its end with screw threads fitting corresponding threads in brake collar 6, and is provided within its head with notch 32, to receive the blade of a screw driver.

In the clevis jaw 31, on the right side of brake collar 6, is provided a recess in the outer surface of the clevis jaw, around the hole near the edge of its ends for the reception of the heads of clevis pin 7, and clevis pin 8, respectively. In the point ends of clevis pin 7, and clevis pin 8, are cut threads to engage corresponding cut threads in the clevis jaw 31, on the left side of brake collar 6.

The diameter of the brake collar 6, is a trifle less than the diameter of brake drum 10, so that the brake band 23, will be forced rigidly against the surface of brake drum 10, and will not touch the surface of brake collar 6, when drawn down, in setting the brake.

In reversible counter shaft 1, are situated four or more deep recesses 22, 22, to receive the end of clutch dog 13, which is forced down into it by gravitation. This clutch dog 13, is fastened by means of threaded pin 15, to brake collar 6, and engages one of the recesses 22, 22, only when reversible counter shaft 1, is turned backward. When reversible counter shaft 1, is turned forward on top, the clutch dog 13, is released and is pushed forward into a recess 33, provided for it in brake collar 6.

To the main sprocket wheel 3, is rigidly fastened, by means of threaded pins 27, 27, inside sprocket cone hub 11, and outside cone 25.

On inner edge of main sprocket wheel 3, and adjoining reversible counter shaft 1, are three recesses 30, 30, 30, in which are loosely hung the three clutch dogs 34, 34, 34, which are provided with trunnions, one on either side, at the hinge end of the dog, which trunnions hang in recesses, one on inside sprocket cone hub 11, and one in outside cone 25, respectively.

In reversible counter shaft 1, are four or more recesses 21, 21, made to engage clutch dogs 34, 34, when the reversible counter shaft 1, is rotated forwardly on top at a greater speed, than that of main sprocket wheel 3; but when main sprocket wheel 3, is rotated forward on top faster than reversible counter shaft 1, the clutch dogs 34, 34, 34, are so arranged as to enter recesses 35, 35, thus releasing therefrom recesses 21, 21. Forward rotary motion on top, of reversible counter shaft 1, by means of pedal cranks 12, 12, or other means will cause one of the clutch dogs 34, to engage one of the recesses 21, and thus cause main sprocket wheel 3, to be turned forward on top, thus moving the motor cycle forward without the agency of the motor.

The brake drum 10, is rigidly attached to inside sprocket cone hub 11, by means of hexagon tenon 14, being forced into a corresponding hexagon mortise in the brake drum 10.

The locating of the coaster brake in the crank hanger instead of in the rear wheel, obviates the necessity of the two chains or two belts between the sprocket wheel or crank hanger, and the hub of the rear wheel of a motor cycle. It also places the delicate and complicated mechanism in a part of the machine, removed from the dirt and dust carried up by the rear wheel. The forward lower end of brake band 23, projects farther forward on the left side of line C D, than on the right side of it and this elongation projecting between lines A—B, and C—D, is increased in thickness to about one fourth ($\frac{1}{4}$) of an inch to give size to allow the drilling of a hole horizontally therein from right to left to receive clevis pin 8, which is attached thereto at lower ends of two clevis jaws 31, 31, while the terminal part of brake band 23, to the right of line C—D, is less than one eighth ($\frac{1}{8}$) of an inch in thickness, and is cut back about one fourth ($\frac{1}{4}$) of an inch shorter than the part containing clevis pin 8.

Although I have shown my coaster brake, and reversible counter shaft in connection with a motor cycle, it will be understood that I reserve the right to connect it with not only a two wheel motor cycle, but also with an automobile or other velocipede or locomotive.

Having thus described my invention, I claim as new and desire to secure by Letters Patent:

In a coaster brake and reversible counter shaft mechanism, for motorcycles, the combination of a crank hanger, a crank shaft rotatable therein, two series of clutch recesses in the said crank shaft, one without the crank hanger, a sprocket wheel loosely mounted on said crank shaft, over the clutch recesses without the crank hanger, a plurality of clutch dogs pivotally mounted in said sprocket wheel and adapted to engage the series of said recesses, without the crank hanger when the crank shaft is turned forward, a brake collar loosely mounted on said crank shaft, within the said crank hanger, a clutch dog pivotally mounted in said brake collar and adapted to engage the other series of clutch recesses, within the crank hanger when the crank shaft is turned backward, a brake drum attached to said sprocket wheel and encircling said shaft, a brake band encircling said brake drum and connected at one end to the inside of the crank hanger, a clevis connected between the swing end of the brake band and the under side of said brake collar, ball bearings in one end of said crank hanger supporting the said sprocket wheel, ball bearings in the opposite end of said crank hanger supporting said crank shaft at one end, ball bearings on the hub of said sprocket wheel supporting said crank at the other end, said brake drum being mortised rigidly to the inner part of the hub of said sprocket wheel, means for driving said crank shaft backward and causing said brake band to enclasp said brake drum, an auxiliary sprocket wheel rim rigidly attached to the inside of the said sprocket wheel and provided to connect with a propelling motor by means of a sprocket chain, trunnions pivotally supporting said locking dogs in said sprocket wheel by passing into bearings in the jaws of its two-piece hub, a screw bolt pivotally supporting the locking dog in the top part of said brake collar, all substantially as set forth.

DENNIS MATHEW KEEFE.

Witnesses:
W. L. PHILLIPS,
JOHN BOYD.

---

Copies of this patent may be obtained for five cents each, by addressing the "Commissioner of Patents, Washington, D. C."